United States Patent
Barber et al.

(10) Patent No.: US 11,548,656 B2
(45) Date of Patent: Jan. 10, 2023

(54) VIRTUAL GUARDED SWITCH

(71) Applicant: Rockwell Collins, Inc., Cedar Rapids, IA (US)

(72) Inventors: Sarah Barber, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 201 days.

(21) Appl. No.: 16/577,560

(22) Filed: Sep. 20, 2019

(65) Prior Publication Data

US 2021/0086912 A1 Mar. 25, 2021

(51) Int. Cl.
| | |
|---|---|
| *G06F 3/048* | (2013.01) |
| *B64D 45/00* | (2006.01) |
| *G06F 3/0482* | (2013.01) |
| *G06F 3/04883* | (2022.01) |

(52) U.S. Cl.
CPC .......... *B64D 45/00* (2013.01); *G06F 3/0482* (2013.01); *G06F 3/04883* (2013.01)

(58) Field of Classification Search
CPC ....... B64D 45/00; B64D 43/00; G06F 3/0482; G06F 3/04883; G06F 3/04812; G06F 3/04817
See application file for complete search history.

(56) References Cited

U.S. PATENT DOCUMENTS

| | | | | |
|---|---|---|---|---|
| 9,703,476 | B1 * | 7/2017 | Pappas | G06F 3/04847 |
| 2012/0022720 | A1 * | 1/2012 | Deleris | G06F 3/0489 |
| | | | | 701/3 |
| 2014/0043241 | A1 * | 2/2014 | Sukumar | G06F 3/013 |
| | | | | 345/173 |
| 2014/0062893 | A1 * | 3/2014 | Kawalkar | G06F 3/04186 |
| | | | | 345/173 |
| 2014/0132555 | A1 | 5/2014 | Becouarn et al. | |
| 2016/0209969 | A1 * | 7/2016 | Lancaster | G06F 3/0488 |
| 2017/0210484 | A1 * | 7/2017 | Figard | B64D 45/00 |

FOREIGN PATENT DOCUMENTS

| | | |
|---|---|---|
| EP | 2439632 A2 | 4/2012 |
| EP | 3796143 A1 | 3/2021 |
| FR | 2911409 A1 | 7/2008 |

OTHER PUBLICATIONS

Search Report for European Application No. 19216162.8 dated Mar. 24, 2021, 2 pages.

* cited by examiner

*Primary Examiner* — Aleksey Olshannikov
(74) *Attorney, Agent, or Firm* — Suiter Swantz pc llo

(57) ABSTRACT

A system and method for actuating a critical aircraft system via a virtual guarded switch includes a touchscreen-based Virtual Guarded Switch (VGS) used to replace physical guarded switches. Aircraft systems display the VGS on traditional touch screen displays either via pilot selection or automatically as a result of an abnormal condition. The VGS maintains protection against inadvertent touchscreen activation while remaining familiar, quick, and easy to understand and use.

15 Claims, 6 Drawing Sheets

VIRTUAL GUARDED SWITCH

BACKGROUND

Traditionally, switches controlling aircraft systems critical to flight safety are guarded by a removable physical cover which keeps the critical switch from being inadvertently actuated causing irreversible consequences. Examples of such switches include engine fire suppression, generator disconnect, and hydraulic shut-off valves. A pilot must physically raise the cover before the switch is available for function.

A traditional toggle switch may be guarded by a "red guard" spring loaded to remain in each of a covered position enclosing the toggle switch and an open position once opened. A traditional press button switch may also be similarly guarded by a hinged cover removable by the pilot. Some hinged covers may be clear for visualization of the switch underneath while some covers remain opaque.

As flight deck technology evolves to include a reduced number of physical switches and more touchscreen-based functionality, the risk of inadvertent activation has the potential to increase. Without protection, an unguarded touchscreen switch may be easily actuated. Additionally, a human factors consideration may include guarded switches typically used during abnormal or emergency situations. In these emergency situations, familiarity, speed, and ease of operation may be highly desired.

Therefore, a need remains for a system and related method which may overcome these limitations and provide a novel solution to presenting a virtual guarded switch (VGS) via touchscreen enabling pilot action to remove the virtual guard and actuate a system associated with the VGS.

SUMMARY

In one aspect, embodiments of the inventive concepts disclosed herein are directed to a system for actuation of an aircraft system via a virtual guarded switch (VGS). The system may comprise an aircraft flight deck touch screen display onboard an aircraft and a controller operatively coupled with the aircraft flight deck touch screen display. For function, a tangible, non-transitory memory may be configured to communicate with the controller, the tangible, non-transitory memory having instructions stored therein that, in response to execution by the controller, cause the controller to carry out a plurality of steps of the system for actuation of an aircraft system via the VGS.

The controller may receive a command to present the VGS, the VGS including a virtual guard in a closed position inhibiting a function of the VGS, the VGS function associated with at least one aircraft system onboard the aircraft and present the VGS on the aircraft flight deck touch screen display. As a user may press the VGS the controller may receive a depress indication of the VGS and present an open delay timer proximal with the VGS during an open delay time.

If commanded, the controller may open the virtual guard to an open position if the depress indication continued during the open delay time and start a guard auto close timer when the virtual guard reaches the open position. For actuation of the system the controller may receive a removal indication indicating the user has removed a touch from the display and receive an actuation indication if the VGS is depressed before an expiration of the guard auto close timer.

The controller may actuate the function of the at least one aircraft system upon receipt of the actuation indication and present an actuated status on the VGS upon a confirmation the aircraft system has actuated. To close the virtual guard, the controller may close the virtual guard to the closed position after presenting the actuated indication and close the virtual guard to the closed position over an unactuated VGS upon an expiration of the guard auto close timer with no receipt of the actuation indication.

A further embodiment of the inventive concepts disclosed herein may include a method for actuation of a system via a virtual guarded switch (VGS). The method may include receiving a command to present the VGS, the VGS including a virtual guard in a closed position covering the VGS and presenting the VGS on a selected display. The method may include receiving a depress indication of the VGS and presenting an open delay timer proximal with the VGS during an open delay time. To open the virtual guard, the method may include opening the virtual guard to an open position if the depress indication continued during the open delay time and starting a guard auto close timer when the virtual guard reaches the open position.

Should the user remove the touch after the open delay timer has elapsed, the method may include receiving a removal indication and receiving an actuation indication if the VGS is depressed while the virtual guard is in the open position. For system actuation, the method may include actuating at least one system associated with a function of the VGS upon receipt of the actuation indication and presenting an actuated status on the VGS upon a confirmation the aircraft system has actuated.

To close the virtual guard, the method may include closing the virtual guard to the closed position after presenting the actuated indication and closing the virtual guard to the closed position over an unactuated VGS upon an expiration of the guard auto close timer with no receipt of the actuation indication.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
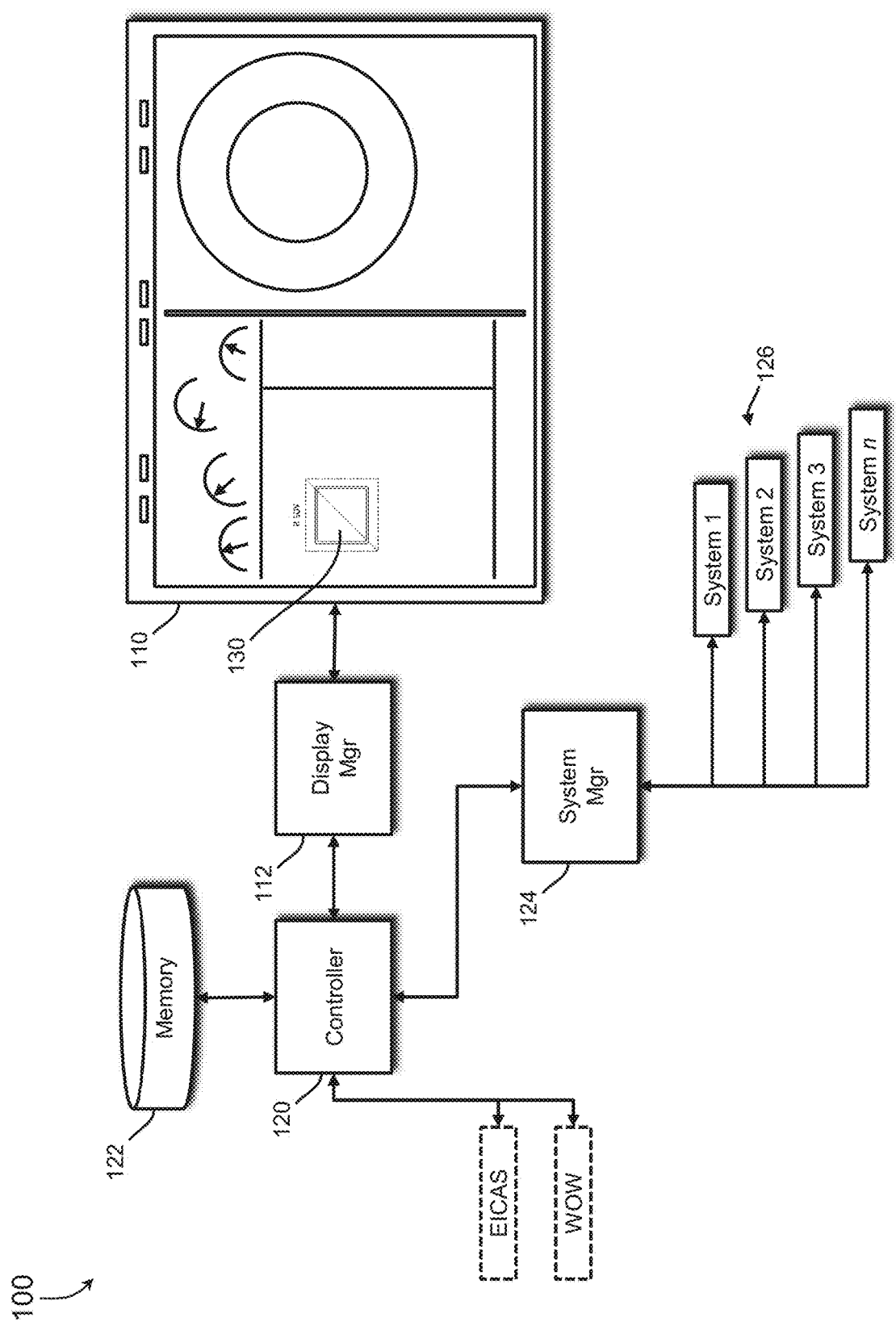
FIG. 1 is a diagram of a system for actuation of an aircraft system via a virtual guarded switch (VGS) in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method for actuating a critical aircraft system via a virtual guarded switch includes a touchscreen-based Virtual Guarded Switch (VGS) used to replace physical guarded switches. Aircraft systems display the VGS on traditional touch screen displays either via pilot selection or automatically as a result of an abnormal condition. The VGS maintains protection against inadvertent touchscreen activation while remaining familiar, quick, and easy to understand and use.

| REFERENCE CHART | |
|---|---|
| 100 | System for VGS |
| 110 | Touchscreen Display |
| 112 | Display Manager |
| 120 | Controller |
| 122 | Memory |
| 124 | System Manager |
| 126 | Aircraft Systems |
| 130 | Virtual Guarded Switch (VGS) |
| 132 | Unguarded VGS |
| 134 | Actuated VGS |
| 136 | Guarded actuated VGS |
| 140 | Virtual guard |
| 142 | Opening graphic |
| 144 | Open virtual guard |
| 146 | VGS Label |
| 150 | Open delay timer |
| 200 | VGS Sequence |
| 234 | VGS Status |
| 300 | Logic Flow |
| 302 | Present Display |
| 304 | Present VGS |
| 306 | VGS depressed? |
| 308 | Present delay timer |
| 310 | VGS remains depressed? |
| 312 | Present opening graphic |
| 314 | Present unguarded VGS |
| 316 | Start guard auto close timer |
| 318 | Receive removal indication |
| 320 | Actuation indication? |
| 322 | Actuate system function |
| 324 | Close guard unactuated VGS |
| 326 | Present actuated indication |
| 328 | Close guard over actuated |
| 400 | Method Flow |
| 402 | Receive Command |
| 404 | Presenting the VGS |
| 406 | Receiving a Depress Indication |
| 408 | Presenting Open Delay |
| 410 | Opening the VGS |
| 412 | Start Guard Auto Close timer |
| 414 | Receiving removal indication |
| 416 | Receiving actuation indication |
| 418 | Actuating a System |
| 420 | Presenting actuated status |
| 422 | Closing over actuated VGS |
| 424 | Closing over unactuated VGS |

FIG. 1

Referring now to FIG. 1, a diagram of a system for actuation of an aircraft system via a virtual guarded switch (VGS) in accordance with an embodiment of the inventive concepts disclosed herein is shown. Generally, the system for actuation of an aircraft system via a VGS 100 may comprise an aircraft flight deck touch screen display 110 onboard an aircraft with a controller 120 operatively coupled with the aircraft flight deck touch screen display 110. In some configurations, a display manager 112 may function to format commands between the controller 120 and the display 110 for proper operation.

In one embodiment of the inventive concepts disclosed herein, the aircraft flight deck touch screen display 110 (hereinafter "the display") may include a display within a forward instrument panel, a pedestal, and an overhead panel selectable by a crewmember (e.g., a pilot, a copilot, a cabin crew, weapons system officer, etc.). Here, a multi-function display (MFD), an interactive flight management system (FMS) display, and an interactive engine indicating and crew alerting system EICAS display may function as the display 110.

The system 100 may also include a tangible, non-transitory memory 122 configured to communicate with the controller 120, the tangible, non-transitory memory 122 may include instructions stored therein that, in response to execution by the controller, cause the controller to carry out the steps to provide one or more functions of the system 100.

The controller 120 may command a presentation of a VGS 130 on the display 110. In response to the controller 120 receiving a command to display the VGS 130 from another source, the controller 120 may display the VGS 130 on a conspicuous display available to the flight crew. The VGS 130 may maintain a function associated with one or more aircraft systems 126 onboard the aircraft. In some configurations, a system manager 124 may function between the controller 120 and the aircraft system 126. The system manager 124 may format a specific command from the controller 120 for each individual system.

In one embodiment of the inventive concepts disclosed herein, the controller 120 may include a flight control computer (FCC), a mission computer (MC), and a processor configured for operation of the aircraft system.

FIGS. 2A-2F VGS Sequence

Referring now to FIGS. 2A-2F, diagrams of an exemplary VGS sequence in accordance with an embodiment of the inventive concepts disclosed herein are shown. The VGS sequence 200 may indicate exemplary user action and associated system response.

FIG. 2A

A VGS 130 in the guarded state may display a traditional switch likeness protected by a virtual guard 140. The virtual guard 140 may be a visually distinct cover plainly indicating to the crewmember the switch under the virtual guard 140 is covered. In one embodiment, the virtual guard may be a semi-transparent cover as well as an opaque cover configured to inhibit an actuation indication and function of the VGS 130. A VGS label 146 may indicate to the user the function of the VGS 130. Here, the VGS label 146 may indicate a right shut off valve (R SOV) as the function of the VGS 130 to close the right shut off valve associated with an aircraft hydraulic system.

Figure 2B:
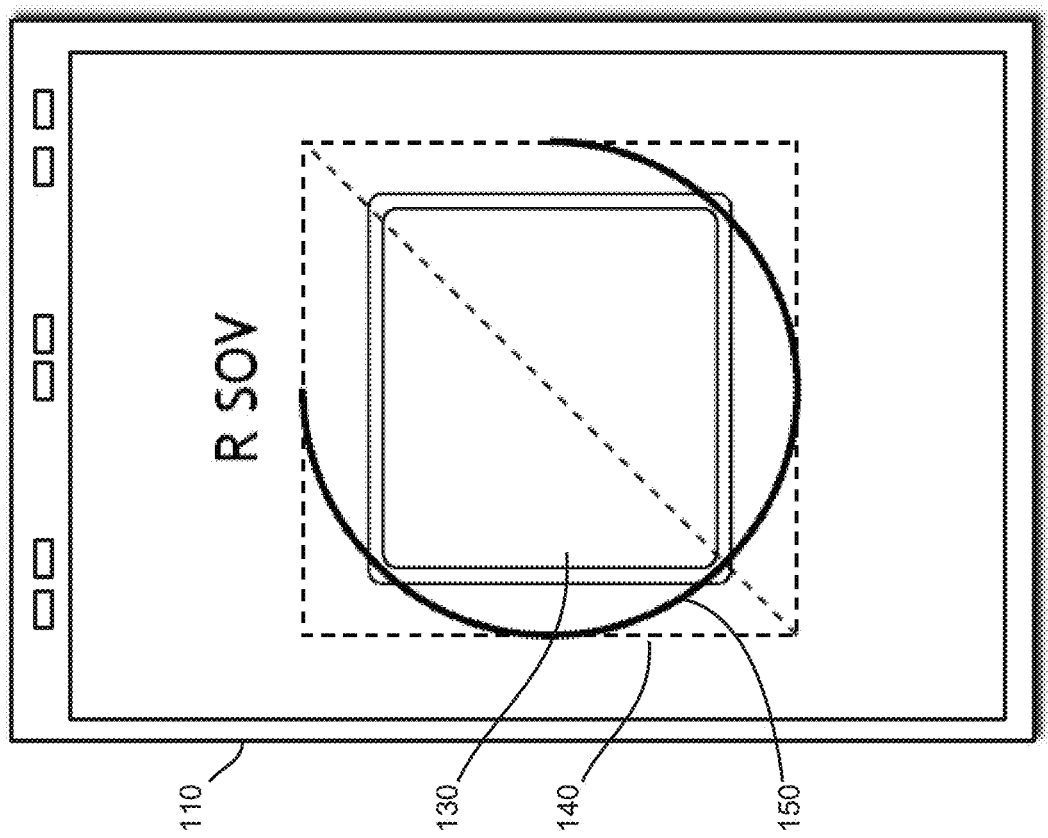
FIGS. 2A-2F are diagrams of an exemplary VGS sequence in accordance with an embodiment of the inventive concepts disclosed herein.
Figure 2A:
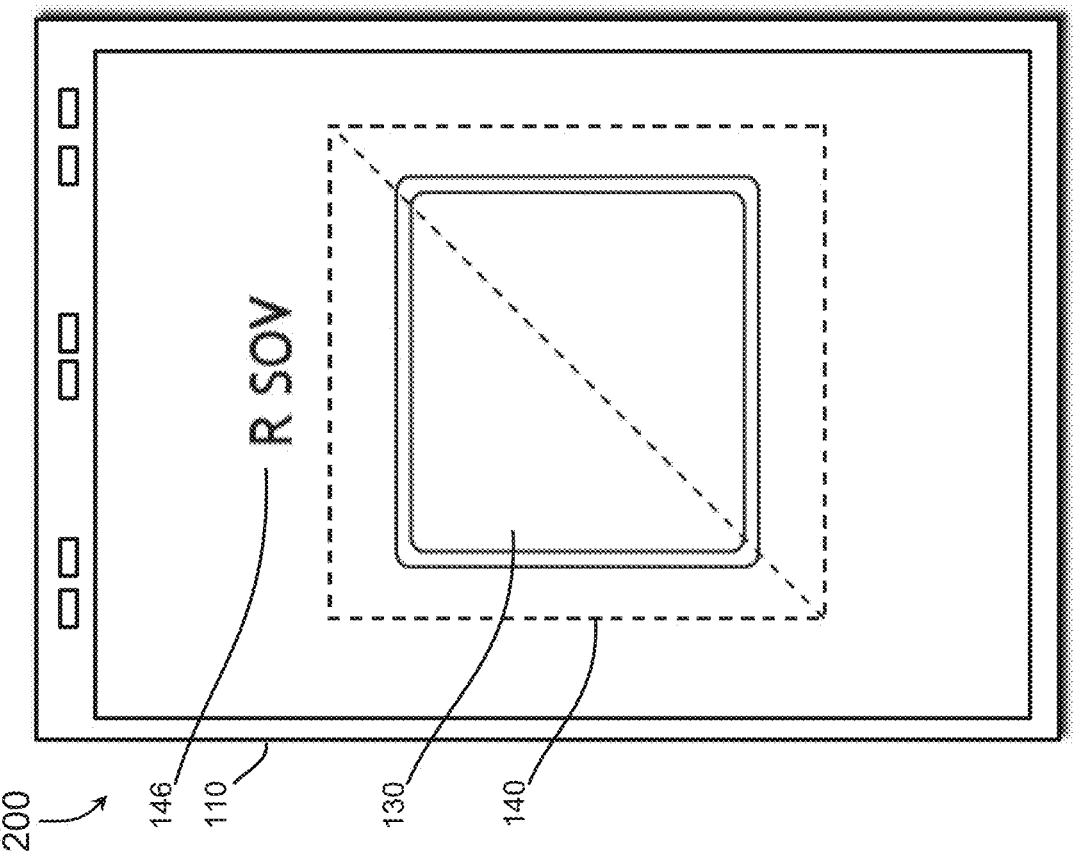
Figure 2C:
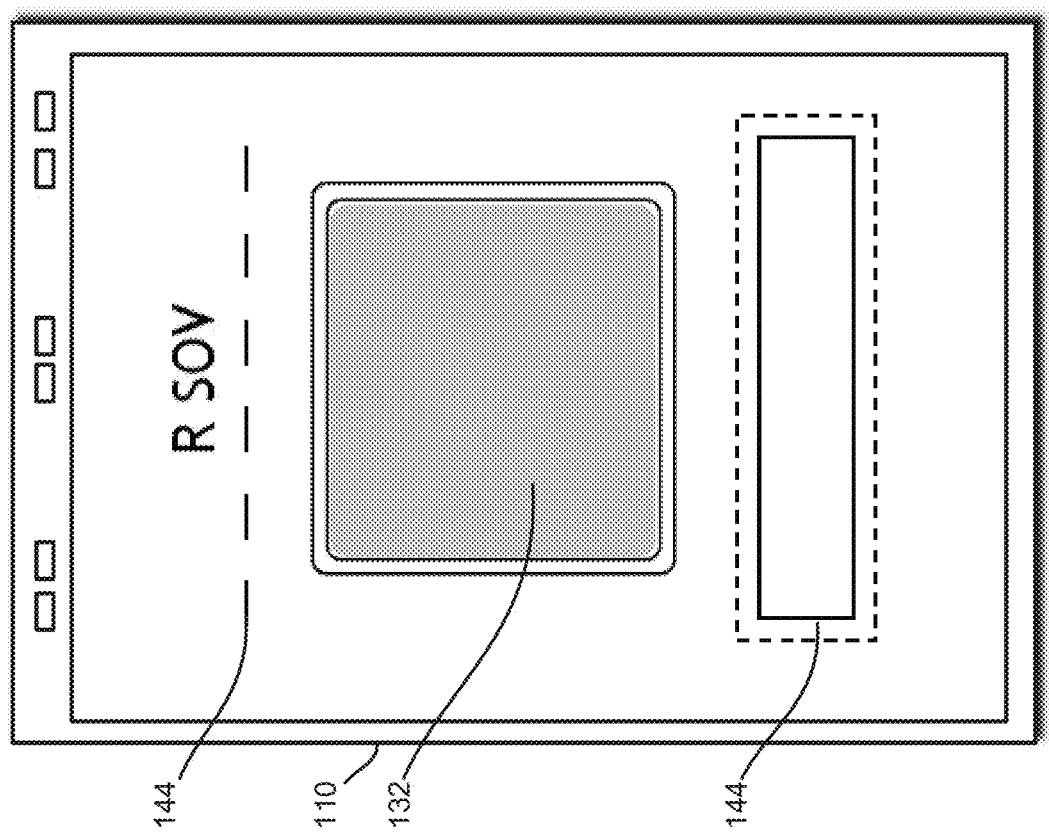
Figure 2D:
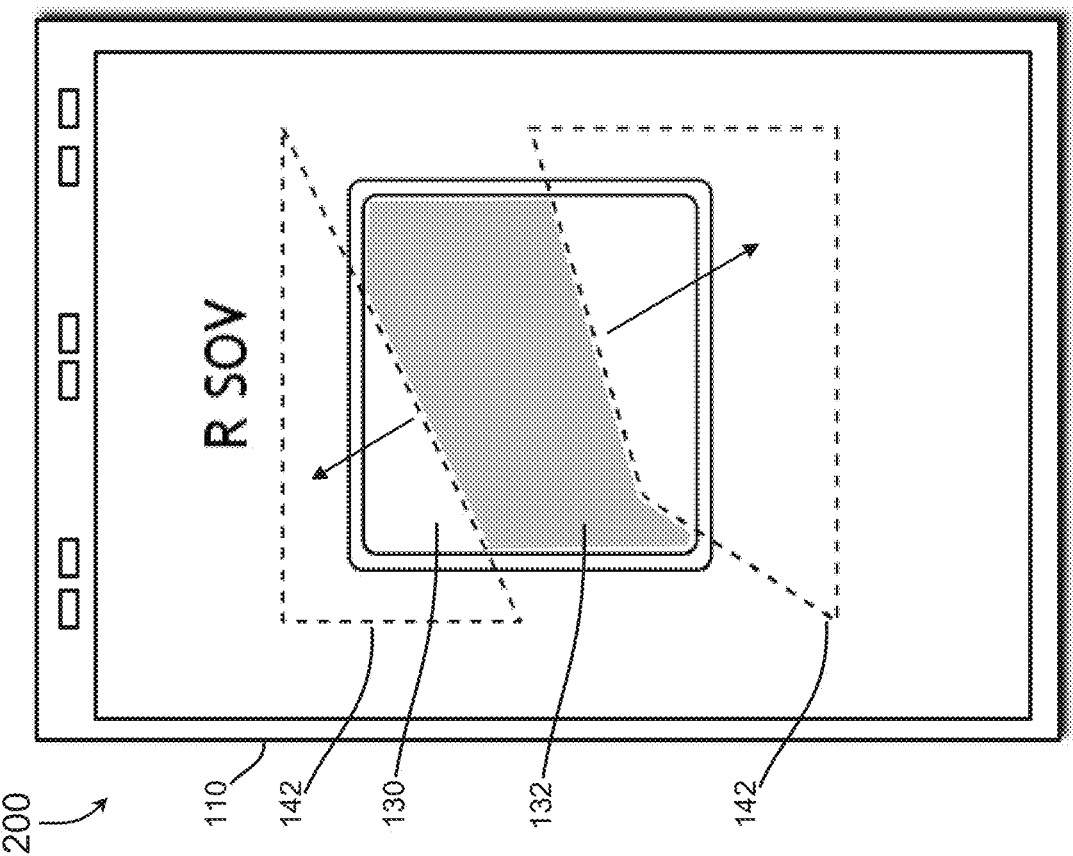
Figure 2F:
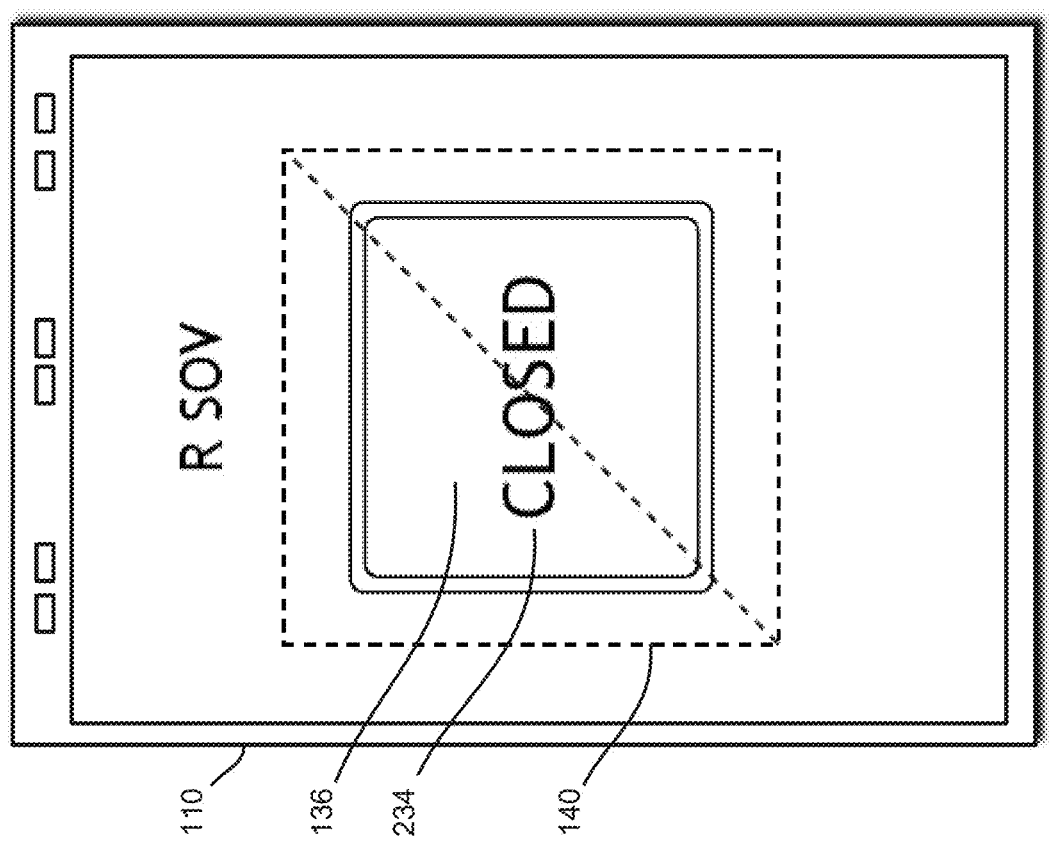
Figure 2E:
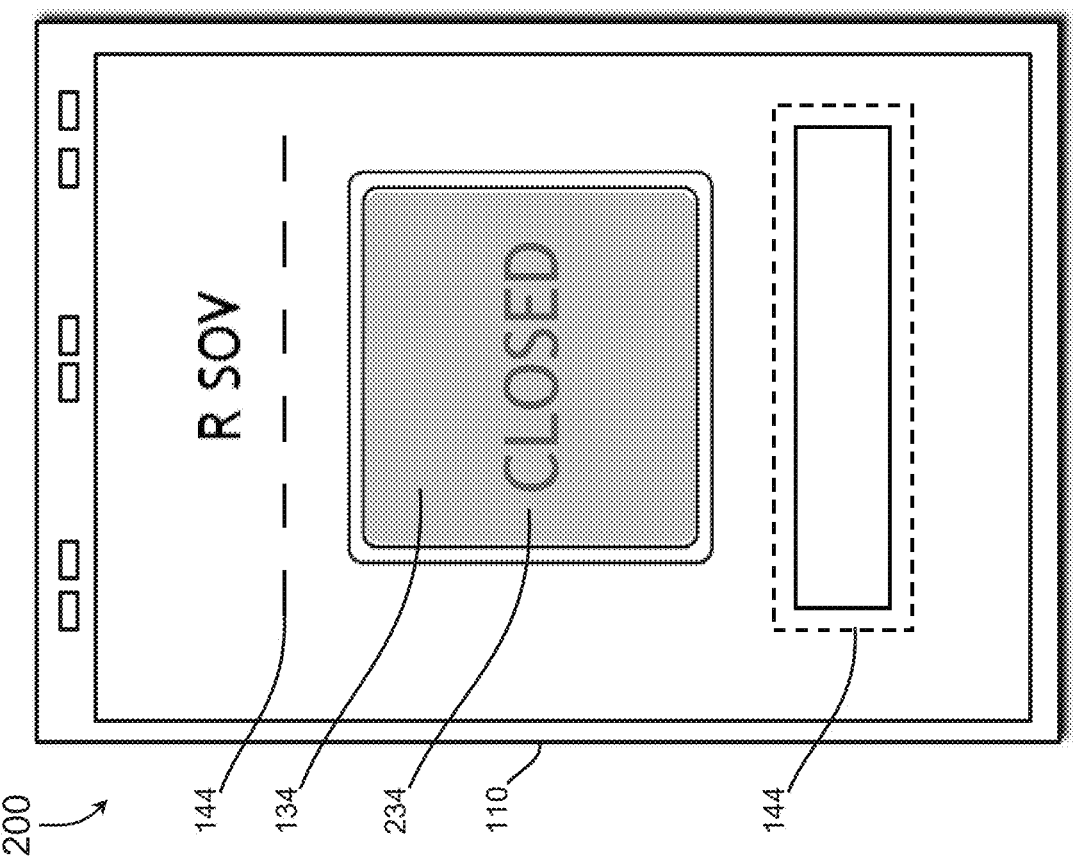

In one embodiment of the inventive concepts disclosed herein, the controller 120 may present the VGS 130 in a likeness of any of a plurality of traditional switch types including a multi-position toggle switch, a knob, a slider, a handle, a square push button, a multi-state switch, etc. The virtual guard 140 may also be presented in a familiar shape and color representative of a traditional guard over a traditional switch. The virtual guard 140, in a closed position as shown in FIG. 2A, may function to indicate to the user the VGS 130 is protected and will not respond to touch screen interaction until the virtual guard 140 is removed. As the virtual guard 140 may be semi-transparent, the user may be able to see a status of the VGS 130 without needing to open the virtual guard 140.

In the guarded state with the virtual guard 140 in the closed position, shown in FIG. 2A, a user may touch the VGS 130 on the display 110 without consequence to ensure an actuation of an aircraft system 126 critical to flight safety as well as a portion of a system 126 may not be inadvertently manipulated. The user touch of the VGS 130 may indicate to the controller 120 a depress indication of the virtual guard 140. Without continuous user pressure on the VGS 130, the controller 120 may command the virtual guard 140 to remain in the closed position covering the VGS 130.

In one embodiment of the inventive concepts disclosed herein, the controller 120 may present the VGS 130 based on a user command to present the VGS 130 as well as based on a controller command to present the VGS based on a current status of the system 126.

FIG. 2B

However, if the user wishes to actuate the VGS 130, the user may perform a specific action to remove the virtual guard 140. The specific action may provide a design assurance required to enhance a security of the system performance. In a traditional guarded switch, removing the guard typically involves flipping the protective cover up, revealing the switch underneath. In one embodiment of the inventive concepts disclosed herein, the user may press and hold the VGS 130 for a period sending the depress indication to the controller 120 to eventually remove the virtual guard 140. FIG. 2B may indicate an open delay timer 150 which may indicate to the user a) the press-and-hold operation has been registered and is in progress, and b) how much longer the press-and-hold operation needs to be maintained before the cover will open.

For display 110 devices which may incorporate haptic feedback, rumbling or similar effects may be used in addition to the open delay timer as a way to further communicate to the user the state of the cover activation state.

Here, the user may touch and hold the VGS 130 on the display 110 to enable the open delay time to begin. Contemplated herein, additional gestures may provide an input to the controller 120 to ensure accurate gesture interpretation and begin the open delay timer. For example, a user sliding or rotating one or more fingers across the display 110 may indicate to the controller the user desires to begin the open delay timer.

The open delay timer 150 may function to indicate to the user a time remaining until the controller 120 may change the virtual guard 140 from the closed position to an open position. Here, a circular open delay timer 150 may increase from a zero position at an exemplary 3 o'clock to a time out position after a 360-degree clockwise swing back to the 3 o'clock position.

In one embodiment of the inventive concepts disclosed herein, the open delay timer 150 may be presented to the user in additional graphical formats including a circular timer (e.g., clock), a vertical timer (e.g., hourglass), and additional time related graphics for ease of user recognition.

In one embodiment of the inventive concepts disclosed herein, the open delay timer 150 may function as a delay preventing inadvertent actuation of the VGS 130. The magnitude of the open delay time may be proportional to the criticality of the system to which the VGS 130 is associated. For example, a routine hydraulic shut off valve may require an exemplary one second open delay time before the controller 120 commands the virtual guard 140 from the closed position to the open position. However, a highly critical engine cut off switch may require a more lengthy exemplary five second open delay time based on the critical nature of securing an engine.

Contemplated herein, a weight on wheels (WOW) status may function as an additional input for the controller 120 to determine the open delay time. For example, with weight on wheels, the controller 120 may set the open delay time for all VGS 130 to one second to enable an aircrew to quickly secure an engine on the ground. Additionally, a mission status may also provide an input to the controller 120 to set the open delay time. For example, a single seat fighter aircraft flying a combat mission may require less of an open delay time while a multi-crew transport category aircraft using crew resource management techniques may require a longer open delay time to accomplish crew coordination and verification of correct VGS 130 selection and actuation.

Further, an indication of an abnormal may cause the controller 120 to alter the open delay time or wholly remove the open delay time. The controller 120 may present the VGS 130 on the selected display and open the virtual guard 140 to the open position as a result of an automated checklist generated by a crew alerting system. For example, the controller 120 may sense an abnormal situation requiring prompt aircrew action and present a VGS 130 with the virtual guard 140 in the open position based on an EICAS input of an abnormal checklist. In this manner, the aircrew may promptly execute steps of an abnormal checklist without waiting for the open delay time.

FIG. 2C

Under normal conditions, once a user may press and hold the VGS 130 for the duration of the open delay time, the controller 120 may present the virtual guard 142 opening from the closed position to the open position.

FIG. 2D

Once the opening transition is complete, the controller 120 may present the VGS 130 with an open virtual guard 144 indicating to the user an unguarded VGS 132 is ready for actuation.

Once the virtual guard 140 is in the open position, the controller 120 may begin a guard auto close timer. The controller 120 may command separate guard auto close timers depending on whether the user interacted with the unguarded VGS 132 or not. As an unguarded VGS 132 may present an opportunity for inadvertent action, the controller may move the virtual guard back to the closed position if the user does not actuate the unguarded VGS 132 within the guard auto close timer. One exemplary guard auto close timer magnitude may be five seconds.

In one embodiment of the inventive concepts disclosed herein, the controller 120 may present the unguarded VGS 132 as an alternate color or shade from that of the guarded VGS 130. For example, the controller 120 may present a guarded VGS 130 as white while presenting the unguarded VGS 132 as green.

FIG. 2E

In one embodiment of the inventive concepts disclosed herein, to ensure accurate selection of the unguarded VGS 132, the controller 120 may require the user to perform a three step process to actuate the function of the VGS 130: via 1) the press and hold sending a depress indication to start the open delay timer, 2) once the open delay timer has elapsed, remove the touch from the display 110 sending a removal indication, and 3) sending an actuation indication by a reapplication of the touch to actuate the unguarded VGS 132.

Once the user has actuated the unguarded VGS 132, the controller 120 may present an actuated VGS 134 as well as a VGS status 234 indicating that the VGS 130 has been properly actuated and the system status of the associated system. Here, the VGS status 234 may indicate "CLOSED" as a status of the R SOV in the hydraulic system.

In one embodiment of the inventive concepts disclosed herein, the controller 120 may present the actuated VGS 134 in a different color from the unguarded VGS 132. For example, the controller 120 may present a green unguarded VGS 132 and once actuated, present a red actuated VGS 134.

FIG. 2F

After actuation, the controller 120 may present an actuated and guarded VGS 136. As above, the guard auto close timer may begin once the controller presents the unguarded VGS 132, should the user actuate the unguarded VGS 132 the controller 120 may command the guard auto close timer to an exemplary one second to close the virtual guard 140 and make safe the VGS 130.

FIG. 3

Figure 3:
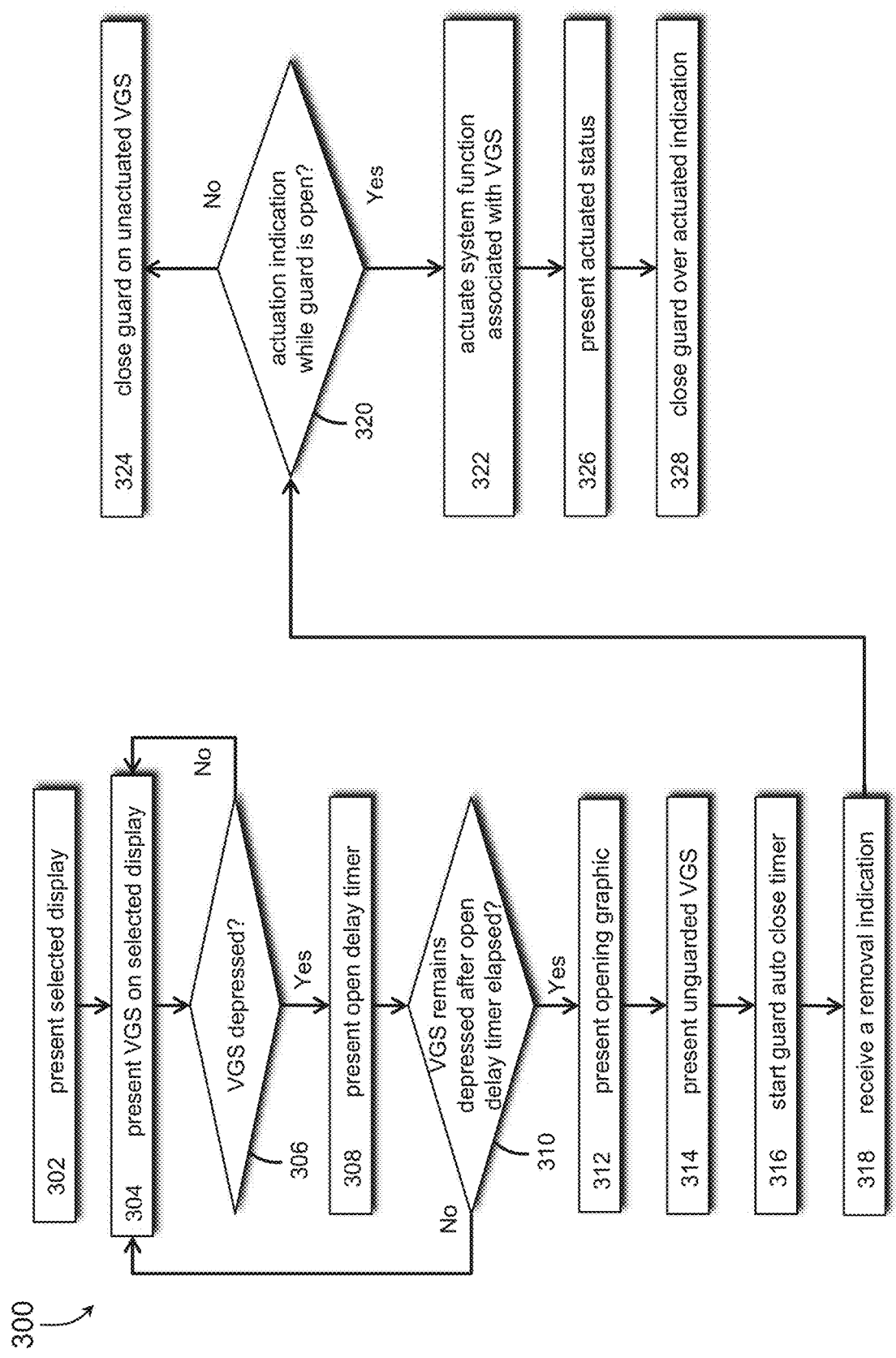
FIG. 3 is a diagrams of an exemplary logic flow for a system for actuation of an aircraft system via a virtual guarded switch in accordance with an embodiment of the inventive concepts disclosed herein.

Referring now to FIG. 3, a diagram of an exemplary logic flow 300 for a system for actuation of an aircraft system via a virtual guarded switch in accordance with an embodiment of the inventive concepts disclosed herein is shown. The controller 120 may present a selected display at a step 302. For example, a selected display may be selected by the user or automatically presented based on an EICAS input. The selected display may include a checklist, a standard system display, and a maintenance display on the aircraft flight deck touch screen display onboard the aircraft.

The controller 120 may receive a command to present the VGS 130 on the selected display and, at a step 304 present the VGS 130. The VGS 130 may include the virtual guard 140 in the closed position inhibiting function of the VGS 130. The VGS 130 function may be associated with at least one aircraft system onboard the aircraft.

The logic may pass to a query 306 to determine if the user has pressed the VGS 130 sending a depress indication to the controller 120. If the result of query 306 is negative the logic may return to the step 304. Should the result of query 306 be positive, the logic may pass to a step 308 with a presentation of the open delay timer 150 proximally with the VGS 130.

A query 310 may determine if the VGS has remained depressed and the controller 120 has received the depress indication during the open delay timer. If a result of query 310 is positive, the logic may pass to a step 312 with a presentation of the opening graphic moving the virtual guard from the closed position to the open position. Should the result of query 310 be negative, the logic may return to the step 304 with continuing the presentation of the VGS 130. Once the opening graphic is complete, the logic may pass to a step 314 to present the unguarded VGS 132 as well as, at a step 316 to start the guard auto close timer.

To continue the logic a step 318 may include receiving removal indication should the user remove a touch from the display 100 sending a discontinuation of the depress indication on the aircraft flight deck touch screen display to the controller 120. A query 320 may determine if the unguarded VGS 132 was actuated and the controller 120 received an actuation indication during the guard auto close timer. Should a result of query 320 be negative, the logic may pass to a step 324 to close the virtual guard 140 on an unactuated VGS 130 and reset of the VGS 130 to an initial guarded presentation. However, should the controller 120 receive an actuation indication the logic may pass to a step 322 to actuate the system function and, at a step 326, to present the actuated status indication on the actuated VGS 134. In one embodiment, the controller 120 may receive the actuated status feedback from the aircraft system before presenting the actuated status of the actuated VGS 134. Once the system has been actuated, the controller 120 may present, at a step 328, the virtual guard 140 in the closed position over the actuated VGS 136.

FIG. 4

Figure 4:
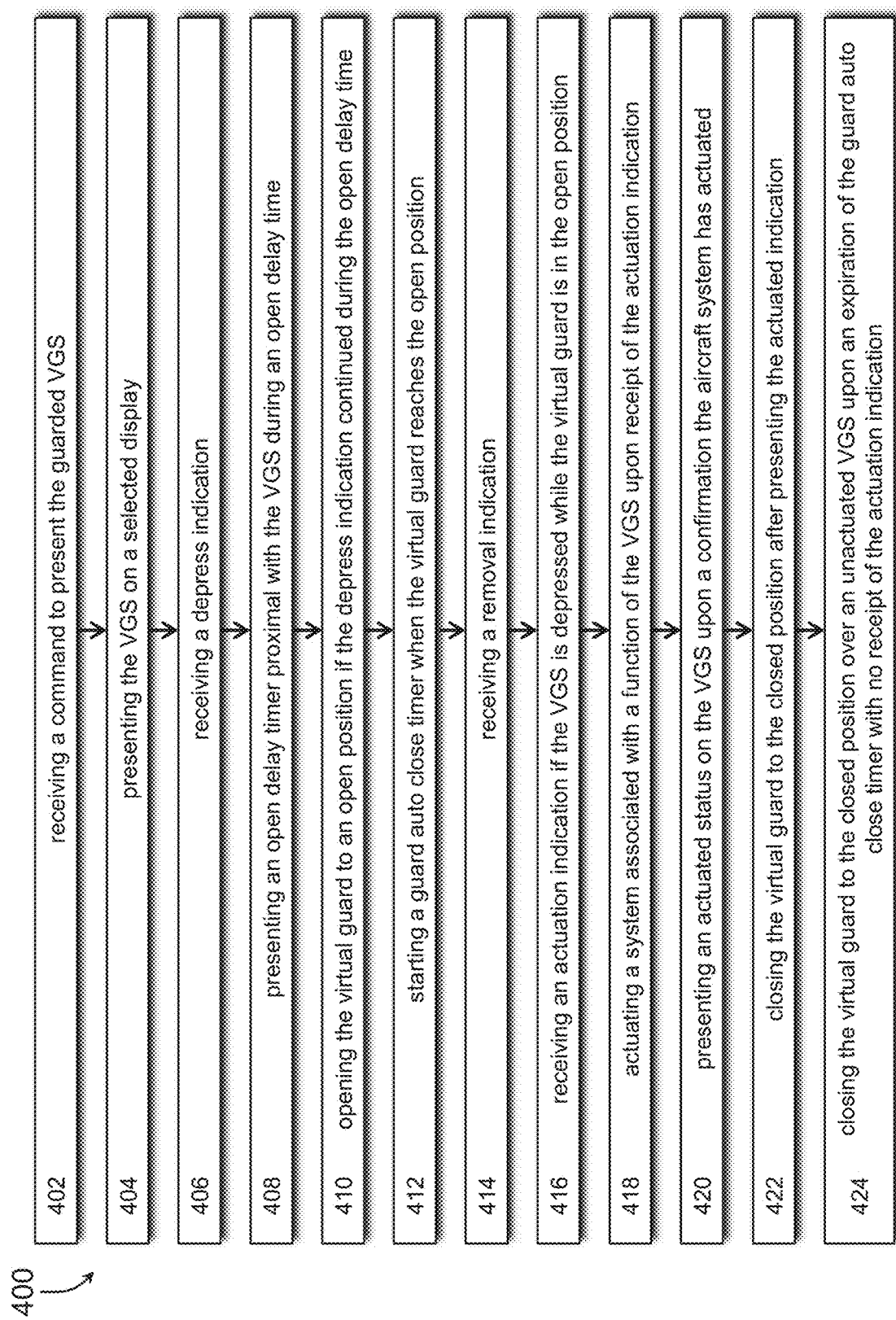
FIG. 4 is a diagram of a method flow exemplary of one embodiment of the inventive concepts disclosed herein.

Referring now to FIG. 4, a diagram of a method flow 400 exemplary of one embodiment of the inventive concepts disclosed herein is shown. A method for actuation of a system via a virtual guarded switch (VGS) may comprise, at a step 402, receiving a command to present the VGS, the VGS including a virtual guard in a closed position covering the VGS and at a step 404, presenting the VGS on a selected display. A step 406 may include receiving a depress indication of the virtual guard while a step 408 may include presenting an open delay timer proximal with the VGS during an open delay time.

A step 410 may include opening the virtual guard to an open position if the depress indication continued during the open delay time while a step 412 may include starting a guard auto close timer when the virtual guard reaches the open position. Should the user remove the touch from the display, a step 414 may include receiving a removal indication while a step 416 may include receiving an actuation indication if the VGS is depressed while the virtual guard is in the open position. A step 418 may include actuating a system associated with a function of the VGS upon receipt of the actuation indication. In embodiments, the controller 120 may command a system manager to perform a system function associated with the system.

A step 420 may include presenting an actuated status on the VGS upon a confirmation the aircraft system has actuated while a step 422 may include closing the virtual guard to the closed position after presenting the actuated indication. Should the user fail to touch the display during the guard auto close timer, a step 424 may include closing the virtual guard to the closed position over an unactuated VGS upon an expiration of the guard auto close timer with no receipt of the actuation indication.

CONCLUSION

As will be appreciated from the above description, embodiments of the inventive concepts disclosed herein may provide a novel solution to presenting a virtual guarded switch (VGS) via touchscreen enabling pilot action to remove the virtual guard and actuate a system associated with the VGS.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for actuation of an aircraft system via a virtual guarded switch (VGS), comprising:
   an aircraft flight deck touch screen display onboard an aircraft;
   a controller operatively coupled with the aircraft flight deck touch screen display;
   a tangible, non-transitory memory configured to communicate with the controller, the tangible, non-transitory memory having instructions stored therein that, in response to execution by the controller, cause the controller to:
   receive a command to present the VGS, the VGS including a virtual guard in a closed position inhibiting a function of the VGS, the VGS function associated with at least one aircraft system onboard the aircraft;
   present the VGS on the aircraft flight deck touch screen display;
   receive a depress indication of the VGS;
   present an open delay timer proximal with the VGS during the depress indication and during an open delay time, a magnitude of an open delay time associated with the open delay timer is proportional to a criticality of the at least one aircraft system, the open delay timer indicating a time remaining until the VGS changes from the closed position to an open position, the open delay time proportional to each of a weight on wheels (WOW) indication and a mission status of the aircraft;
   open the virtual guard to the open position if the depress indication continued during the open delay time;
   start a guard auto close timer when the virtual guard reaches the open position;
   receive a removal indication;
   receive an actuation indication if the VGS is depressed before an expiration of the guard auto close timer;
   actuate the function of the at least one aircraft system upon receipt of the actuation indication;
   present an actuated status on the VGS upon a confirmation the aircraft system has actuated;
   close the virtual guard to the closed position after presenting the actuated indication; and
   close the virtual guard to the closed position over an unactuated VGS upon an expiration of the guard auto close timer with no receipt of the actuation indication.

2. The system for actuation of an aircraft system via a virtual guarded switch of claim 1, wherein the aircraft flight deck touch screen display further comprises at least one display within a forward instrument panel, a pedestal, and an overhead panel selectable by a crewmember.

3. The system for actuation of an aircraft system via a virtual guarded switch of claim 1, wherein the controller further comprises one of: a flight control computer, a mission computer, and at least one processor configured for operation of the at least one aircraft system.

4. The system for actuation of an aircraft system via a virtual guarded switch of claim 1, wherein the removal indication further comprises a discontinuation of the depress indication on the aircraft flight deck touch screen display.

5. The system for actuation of an aircraft system via a virtual guarded switch of claim 1, wherein the at least one aircraft system further comprises an aircraft system critical to flight safety.

6. The system for actuation of an aircraft system via a virtual guarded switch of claim 1, wherein the virtual guard further comprises a visually distinct cover inhibiting the actuation indication associated with the VGS.

7. The system for actuation of an aircraft system via a virtual guarded switch of claim 1, wherein the open delay time is proportional to a criticality of the VGS function.

8. The system for actuation of an aircraft system via a virtual guarded switch of claim 1, wherein the guard auto close timer further comprises a reset of the VGS to an initial guarded presentation.

9. The system for actuation of an aircraft system via a virtual guarded switch of claim 1, wherein the actuated status further comprises feedback from the at least one aircraft system indicating an actuated status of the at least one aircraft system.

10. A method for actuation of a system via a virtual guarded switch (VGS), comprising:
  receiving a command to present the VGS, the VGS including a virtual guard in a closed position covering the VGS;
  presenting the VGS on a selected display;
  receiving a depress indication of the VGS;
  presenting an open delay timer proximal with the VGS during the depress indication and during an open delay time, a magnitude of an open delay time associated with the open delay timer is proportional to a criticality of at least one aircraft system associated with the VGS, the open delay timer indicating a time remaining until the VGS changes from the closed position to an open position, the open delay time proportional to each of a weight on wheels (WOW) indication and a mission status of the aircraft;
  opening the virtual guard to the open position if the depress indication continued during the open delay time;
  starting a guard auto close timer when the virtual guard reaches the open position;
  receiving a removal indication;
  receiving an actuation indication if the VGS is depressed while the virtual guard is in the open position;
  actuating at least one system associated with a function of the VGS upon receipt of the actuation indication;
  presenting an actuated status on the VGS upon a confirmation the aircraft system has actuated;
  closing the virtual guard to the closed position after presenting the actuated indication; and
  closing the virtual guard to the closed position over an unactuated VGS upon an expiration of the guard auto close timer with no receipt of the actuation indication.

11. The method for actuation of a system via a virtual guarded switch of claim 10, wherein receiving a command to present the VGS further comprises receiving one of a user command to present the VGS and a controller command to present the VGS based on a current status of the at least one system.

12. The method for actuation of a system via a virtual guarded switch of claim 10, wherein closing the virtual guard to the closed position further comprises a reset of the VGS to an initial guarded presentation.

13. The method for actuation of a system via a virtual guarded switch of claim 10, wherein presenting the VGS on the selected display and opening the virtual guard to the open position is a result of an automated checklist generated by a crew alerting system.

14. The method for actuation of a system via a virtual guarded switch of claim 10, wherein presenting the VGS on a selected display further comprises presenting a VGS label associated with the VGS.

15. The method for actuation of a system via a virtual guarded switch of claim 10, wherein actuating at least one system associated with a function of the VGS further comprises commanding a system manager to perform a system function associated with the at least one system.

* * * * *